2,999,040
TRANSPARENT LAMINATE OF IMPROVED STABILITY
Duane F. Burdick, Midland, Mich., assignor to Dow Corning Corporation, Midland, Mich., a corporation of Michigan
No Drawing. Filed May 25, 1959, Ser. No. 815,309
1 Claim. (Cl. 154—2.71)

This invention relates to an improved organosilicon rubber and to laminate structures containing said rubber.

One of the problems which is associated with high speed vehicles is the heating effect on various structural materials in the vehicle. On such vehicles the normal interlayer material employed in making shatter-proof windshields is not suitable. However, the need for such a material was filled by transparent organosiloxone rubbers, particularly the ones described in the copending application of William H. Daudt, Serial No. 460,770, filed October 6, 1954, the entire disclosure of which is hereby incorporated herein by reference. With the introduction of such materials it is now possible to prepare laminated glass structures which are suitable for use in transparend windshields on high speed vehicles such as aircraft and the like.

It has been found, however, that there is a tendency for the transparent organopolysiloxane elastomers to degrade when in contact with a combination of sunlight and certain gases such as $SO_2$, $NO_2$ and volatile sulfides in general. The problem is particularly troublesome in industrial areas and on aircraft in which polysulfide rubber has been used as a sealing material.

The exact cause of this degradation is not known, but it is presumed to be due to a chemical interaction initiated by a combination of sunlight and the gas which results in the oxidation or cleavage of hydrocarbon groups from the silicon. In any event, the degradation is evidenced by a cracking of the siloxane elastomer. This cracking is deleterious to the windshield.

It is the object of this invention to provide a siloxane elastomer which is resistant to degradation caused by combinations of sunlight and reactive gases. Another object is to provide an improved interlayer structure for use in high speed vehicles. Other objects and advantages will be apparent from the following description.

This invention relates to a diorganopolysiloxane elastomer containing from 5 to 20 parts per 100 parts by weight polysiloxane of sodium dichromate and up to 30 parts by weight per 100 parts polysiloxane of zinc oxide.

Applicant has found that the incorporation of from 5 to 20 parts by weight of sodium dichromate into organopolysiloxane rubbers increases the resistance of the rubbers some fifty-fold to the degradation effects of sunlight and sulfur gases. The proportions of dichromate employed are critical since if less than 5 parts of dichromate is employed the life of the siloxane elastomer is not appreciably improved while if more than 20 parts of the dichromate is used the thermal stability of the elastomer is seriously affected particularly at temperatures of 150° C. and above.

For the purpose of this invention the dichromate can be either hydrated or anhydrous. The anhydrous form is preferred particularly for use in sealed structures which are to be operated at high temperatures.. The dichromate can be incorporated in the elastomer in any convenient manner such as by milling.

The zinc oxide is an optional ingredient, but it has been found that the presence of zinc oxide in the range stipulated improves the adhesion of the rubber-dichromate composition to glass and aluminum. This is desirable since in laminates employed on high speed vehicles the adhesion of the interlayer to the glass or to any aluminum inserts is highly important. If the adhesion drops too low then delamination of the assembly will occur under pressure which is of course dangerous particularly in the case of aircraft operating at high altitudes.

For the purpose of this invention the composition of the siloxane elastomer is not critical. That is, the elastomer can be composed essentially of any diorganopolysiloxane normally employed in the preparation of siloxane elastomers. Thus, for example, the elastomer may be composed of dimethylpolysiloxane, phenylmethylpolysiloxane, trifluoropropylmethylpolysiloxane, vinylmethylpolysiloxane or copolymers thereof with each other and with diphenylsiloxane.

Fillers are optional in the compositions of this invenion, but, if desired, one can employ any of the fillers commonly employed in silicone rubbers. These include, for example, metal oxides such as titania, zirconia or siliceous materials such as crushed quartz, diatomaceous earth or clays or reinforcing fillers such as fume silicas, silica aerogels, or high surface area precipitated silicas or carbon black. If desired, the fillers employed may have organosilyl groups such as trimethylsilyl groups attached to the surface thereof. Such fillers are specifically disclosed in the aforesaid Daudt application and in U.S. Patent 2,863,846.

In addition, the elastomers employed in this invention may contain any of the additives commonly employed in silicone rubber such as compression set additives, thermal stability additives, pigments, and the like.

The compositions of this invention are not transparent due to the presence of the sodium dichromate and, if desired, the zinc oxide. Consequently, they alone cannot be used as transparent interlayers for glass laminates. It has been found, however, that these materials protect the transparent siloxane elastomer if the edges of the glass laminate are sealed with the compositions of this invention. This will prevent or reduce the diffusion of the deleterious gases into the transparent portion of the siloxane rubber and thereby retard degradation.

The edges of the laminates of this invention can be sealed with the dichromate-containing elastomer in any desired manner and the seal can be of any desired thickness. The best way of accomplishing this is to apply a strip of the unvulcanized elastomer containing the dichromate and, if desired, zinc oxide around the edge of the glass sheet to be laminated in such a manner that the elastomer extends the desired distance inward from the edge of the glass sheet thereby forming a border around the edge of the glass. A sheet of unvulcanized transparent organopolysiloxane rubber is then placed inside of this border to cover the remainder of the glass sheet. A second glass sheet is then placed on top of the assembly of the two silicone rubbers. The sandwich of glass and silicone rubber is then placed under sufficient heat and pressure to vulcanize the siloxane elastomers and to cause them to form a unitary sheet so that a secure bond is obtained between the silicone rubber containing the dichromate and the transparent silicone rubber and between each rubber and the glass. Thus the entire assembly is securely bonded together.

It is often desirable to have metal inserts along the edge of the laminate. These inserts are useful for attaching the laminate to the frame of the vehicle. In general, such edge attachments are made of aluminum and in assembling the laminate the elastomer containing the dichromate is positioned between the edge attachment and the glass. If desired, the dichromate containing elastomer may also extend along the edge attachment beyond the edge of the glass. In those cases where edge attachments are employed, it is desirable that the elastomer containing the dichromate does not extend any further into the assembly than the metal edge attachment. This will prevent any narrowing of the field of vision beyond that caused by the edge attachment itself.

For the purpose of this invention the silicone rubbers can be cured by employing any of the well-known vulcanizing agents used with silicone rubber. These include organic peroxides such as benzoyl peroxide, dicumyl peroxide, tertiary butyl perbenzoate and tertiary butyl peroxide; combinations of alkyl silicates such as ethyl orthosilicate, propyl orthosilicate, or the corresponding polysilicates and salts of carboxylic acids such as lead octoate, dibutyltindiacetate and dibutyltindilaurate; and sulfur and sulfur accelerators. When sulfur is employed it is essential that the siloxane contain alkenyl groups attached to the silicon.

The laminates of this invention are capable of prolonged life under conditions where they are exposed simultaneously to sunlight and gases such as $SO_2$ and other volatile sulfides.

The following examples are illustrative only and should not be construed as limiting the invention which is properly delineated in the appended claims. All parts shown below are parts by weight.

The siloxane elastomer employed herein had the formulation 100 parts of a dimethylpolysiloxane gum having copolymerized therewith a small amount of phenylmethylsiloxane and methylvinylsiloxane, 30 parts of the filler of Example 3 of the aforesaid Daudt application and .2 part dicumyl peroxide.

Example 1

Laminates were prepared by placing a sheet of this unvulcanized transparent silicone rubber on a sheet of glass so that the transparent elastomer came within one inch of each edge of the sheet. A one inch wide strip of the same type of elastomer containing the various amounts of sodium dichromate and zinc oxide shown below was then placed along the entire edge of the glass so that the inner edge of said strip abutted against the edge of the transparent elastomer and the outer edge of said strip was coextensive with the outer edge of the glass. A second sheet of glass having the same dimensions as the first, was placed over the assembly. The entire sandwich was then heated at 150° C. for 30 minutes under 300 p.s.i pressure. This produced a laminate in which the entire border was sealed with a strip of rubber containing dichromate, which strip was one inch wide.

Each assembly was then given an accelerated aging test by exposing it to an atmosphere composed of 1/3 by volume oxygen and 2/3 by volume sulfur dioxide while simultaneously the assembly was being exposed to a mercury lamp producing 765 watts of ultraviolet light. During this simultaneous exposure to the gas and ultraviolet light the assembly was maintained at a temperature of 100° C. until the transparent portion of the silicone rubber interlayer was observed to crack. The time required for cracks to form in the transparent interlayer of each assembly is recorded in the table below as "life in hours."

| Parts by weight sodium dichromate per 100 parts polysiloxane gum | Parts by weight zinc oxide per 100 parts polysiloxane gum | Life in hours |
|---|---|---|
| Blank | | 4 |
| 5 | 5 | 144 |
| 10 | 10 | 168 |
| 5 | 0 | 360 |
| 10 | 0 | 216 |
| 20 | 0 | 360 |

In each case the adhesion of the elastomer to the glass was superior when zinc oxide was present. In all cases, however, the adhesion was sufficiently good so that the assembly is operative in a vehicle.

These tests show that the service life of windshields made from transparent siloxane-glass laminates is increased at least 42 times by sealing the edges of the windshields with the compositions of this invention.

That which is claimed is:

A laminate comprising a layer of (1) a transparent organopolysiloxane elastomer between two layers of glass, said elastomer being composed essentially of diorganopolysiloxane, said laminate having the edges thereof sealed with a composition consisting essentially of (2) a diorganopolysiloxane elastomer containing from 5 to 20 parts per 100 parts by weight polysiloxane of sodium dichromate and up to 30 parts per 100 parts by weight of polysiloxane of zinc oxide, said elastomer (2) being firmly bonded to the glass, to elastomer (1), and to any edge attachments affixed to said laminate.

References Cited in the file of this patent

UNITED STATES PATENTS 2,756,171    Thomas    July 24, 1956

FOREIGN PATENTS 658,640    Great Britain    Oct. 10, 1951
707,143    Great Britain    Apr. 14, 1954